(12) United States Patent
Durrant

(10) Patent No.: US 7,887,625 B2
(45) Date of Patent: Feb. 15, 2011

(54) SEALER COMPOSITION

(75) Inventor: Edward Durrant, Pardise, UT (US)

(73) Assignee: Harris Research, Inc., Logan, UT (US)

( * ) Notice: Subject to any disclaimer, the term of this patent is extended or adjusted under 35 U.S.C. 154(b) by 0 days.

(21) Appl. No.: 12/392,011

(22) Filed: Feb. 24, 2009

(65) Prior Publication Data

US 2009/0156723 A1 Jun. 18, 2009

Related U.S. Application Data

(62) Division of application No. 11/383,386, filed on May 15, 2006.

(51) Int. Cl.
C09K 3/00 (2006.01)
C09K 3/10 (2006.01)
C09D 5/00 (2006.01)
B05D 7/06 (2006.01)
B05D 7/08 (2006.01)
B05D 7/10 (2006.01)
B08B 3/08 (2006.01)

(52) U.S. Cl. .......................... 106/3; 106/2; 106/15.05; 106/18.3; 106/18.13; 252/383; 427/397; 427/325; 427/408; 427/202; 427/203; 134/27

(58) Field of Classification Search ............... 106/2, 106/3, 18.13, 15.05, 18.3; 252/8.82
See application file for complete search history.

(56) References Cited

U.S. PATENT DOCUMENTS

| | | | |
|---|---|---|---|
| 2,191,431 A * | 2/1940 | Kauffmann | 8/111 |
| 2,829,067 A * | 4/1958 | Eastland | 427/393 |
| 3,017,236 A * | 1/1962 | Stalter | 8/111 |
| 3,714,099 A | 1/1973 | Biale | |
| 3,755,297 A | 8/1973 | Campbell et al. | |
| 3,854,987 A | 12/1974 | Michael | |
| 3,900,327 A | 8/1975 | Miller | |
| 4,193,993 A | 3/1980 | Hilditch | |
| 4,430,367 A * | 2/1984 | Lat | 427/388.4 |
| 4,456,750 A | 6/1984 | Marttala et al. | |
| 4,652,393 A * | 3/1987 | Ely et al. | 252/79.5 |
| 4,734,138 A * | 3/1988 | Ely et al. | 134/27 |
| 4,873,084 A | 10/1989 | Sallay | |
| 4,897,291 A | 1/1990 | Kim | |
| 5,002,748 A | 3/1991 | Jones et al. | |
| 5,055,506 A | 10/1991 | Knutson | |
| 5,306,744 A | 4/1994 | Wolfersberger et al. | |
| 5,356,716 A | 10/1994 | Patel | |
| 5,484,849 A | 1/1996 | Bors et al. | |
| 5,773,487 A | 6/1998 | Sokol | |
| 5,880,190 A * | 3/1999 | Laura | 524/236 |
| 6,031,041 A * | 2/2000 | Chung et al. | 524/507 |
| 6,191,213 B1 | 2/2001 | Tomko et al. | |
| 6,444,134 B1 * | 9/2002 | Holman et al. | 216/29 |
| 6,512,042 B1 | 1/2003 | Fisher et al. | |
| 6,689,200 B2 | 2/2004 | Scarborough et al. | |
| 6,821,631 B2 | 11/2004 | Grantham et al. | |
| 2002/0110643 A1 | 8/2002 | Sokol | |
| 2003/0040562 A1 | 2/2003 | West et al. | |
| 2003/0104135 A1 * | 6/2003 | Grantham et al. | 427/397.8 |
| 2004/0175407 A1 | 9/2004 | McDaniel | |
| 2004/0261961 A1 | 12/2004 | Aitta et al. | |
| 2005/0124735 A1 * | 6/2005 | Schad et al. | 524/3 |
| 2006/0122091 A1 * | 6/2006 | Durrant | 510/405 |
| 2009/0098282 A1 | 4/2009 | Prasalowicz et al. | |

FOREIGN PATENT DOCUMENTS

JP 2005-343923 12/2005

OTHER PUBLICATIONS

Product information sheet entitled: "SYNTEKO SEALMASTER 1600", from Akzo-Nobel, published Apr. 15, 2004.*
PCT/US2007/061901 International Search Report and Written Opinion, Oct. 2, 2007.
PCT/US2007/061901 International Preliminary Report on Patentability, Oct. 31, 2007.
EP07756811.1 PCT/US2007/061901, Supplementary European Search, Sep. 15, 2010.

* cited by examiner

*Primary Examiner*—Joseph D Anthony
(74) *Attorney, Agent, or Firm*—Kunzler Needham Massey & Thorpe

(57) ABSTRACT

A composition for sealing exposed wood before finishing the wood, which composition includes polymer solids and an acid neutralizing agent. The acid neutralizing agent may be a weak base and/or a buffering agent. The polymer solids may include acrylate monomers, urethane monomers, and the like. Also disclosed is a method of sealing and neutralizing a wood surface before finishing the wood surface by applying the composition to the exposed wood surface.

17 Claims, No Drawings

SEALER COMPOSITION

CROSS-REFERENCE TO RELATED APPLICATIONS

This application is a divisional of and claims priority to Ser. No. 11/383,386 filed May 15, 2006 by Edward Durrant entitled SEALER COMPOSITION, which is incorporated by reference herein in its entirety.

BACKGROUND OF THE INVENTION

1. Field of the Invention

The present invention relates generally to sealer compositions and, more particularly, to neutralizing sealer compositions.

2. Description of the Related Art

Flooring often includes a finish which protects the floor from certain factors that promote wear and deterioration in the floor. Floor finishes may include, for example, oils, polymers, and the like. One extensively used finish includes a polyurethane. As the floor is used, the finish may wear thin, and expose the wood surface. The floor may be refinished to cover the thin finish or exposed wood, or for a variety of other reasons.

To eliminate the problem of a dull appearance of the new finish, the exposed wood surface may be treated with a sealer that prevents the finish from penetrating the wood. The sealer is also applied to allow the finish to maintain its normal shine. Further, the sealer is applied to the exposed wood to keep the finish from discoloring or darkening the bare wood area.

It has been observed that when the wood is exposed, it is often stained, and needs bleaching so that the appearance of the exposed wood is more akin to the color of the wood under the finish. A common wood bleach, oxalic acid, is effective in removing many stains from wood, but can leave the bleached wood in an acidic state. If left in an acidic state during the application of a sealer and/or a finish to the wood, the excess acid can react with the sealer and/or new coat of finish and prematurely precipitate solids from the sealer and/or the finish, resulting in a white, slimy appearance. This problem is particularly acute where the sealer and/or the finish applied includes solids, such as a polyurethane or polyacrylate compositions.

The existing procedure to avoid this slimy precipitate is to neutralize the bleached area with an alkaline product. This alkaline product may act to neutralize the remaining oxalic acid before the finish can be applied. This procedure, however, introduces an extra step into the process of refinishing the floor. The addition of this step increases the time needed to refinish the floor and may increase failure of the new finish because the acid and/or neutralizing agent do not completely dry.

There are some publicly available documents that disclose wood finishing and/or sealing compositions. One such document includes U.S. Pat. No. 6,512,042 to Fischer et. al., (herein incorporated by a reference) which discloses aqueous, storage-stable, crosslinkable polymer compositions comprising: (a) an aqueous dispersion of a an acrylic polymer component containing certain carbonyl-containing functional-groups; (b) a nitrogen-containing compound having at least two carbonyl-reactive nitrogen groups; and (c) optionally, co-solvents, pigments, fillers, dispersants, wetting agents, anti-foam agents, UV absorbers, antioxidants, biocides, and stabilizers. Such compositions may be useful as coatings or binders in coating compositions, or as adhesives.

Further, Tomko discloses in U.S. Pat. No. 6,191,213, (herein incorporated by a reference) low VOC penetrating compositions for staining and protecting porous substrates such as wood, concrete, cement, brick and the like, comprising aqueous dispersions of polyurethane-ureas.

Also, Knutson discloses in U.S. Pat. No. 5,055,506, (herein incorporated by a reference) polyamines having at least two amine groups which are incorporated into a polymer system comprising an anionic surfactant and a polymer having at least one anionic pendant group.

Some compositions for sealing wood are disclosed in U.S. Pat. No. 4,897,291 to Kim, which is herein incorporated by a reference. This patent discloses a sealant composition to seal wood products against moisture absorption and the swelling caused thereby. The sealant composition may be especially adapted to be applied to the cut ends of dimensioned lumber and particularly to the edges of wood products such as plywood, waferboard, oriented strand board and particle board. The composition includes a water-based polymeric binder, a wax hydrophobic filler and a water-soluble alkali metal siliconate salt. The polymeric binder preferably has two components. The first is a soft, stretchy polymer with a low glass transition temperature which allows the binder to stretch when the wood swells due to moisture absorption. The second is a polymer with a high glass transition temperature which enhances binding properties.

What is needed is a sealer composition that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available sealer compositions. According to one embodiment, the present invention has been developed to provide a sealer composition for sealing exposed wood before finishing the wood including polymer solids and an acid neutralizing agent.

According to another embodiment, the polymer solids of the sealer composition may include a polymer of acrylate monomers.

In yet another embodiment, the polymer solids of the sealer composition may include a polymer of urethane monomers.

According to a further embodiment, the polymer solids of the sealer composition may include urethane monomers and acrylate monomers.

In yet a further embodiment, the acid neutralizing agent of the sealer composition may include a base. The base may be one selected from the group consisting of: triethanolamine, ammonia, sodium tetraborate, sodium citrate, sodium carbonate, sodium bicarbonate, TRIS, and mixtures thereof. The base may be sodium tetraborate.

In still a further embodiment, the acid neutralizing agent of the sealer composition may include a buffering agent. The buffering agent may be a weak base selecting from the group consisting of: triethanolamine, ammonia, sodium tetraborate, sodium citrate, sodium carbonate, sodium bicarbonate, TRIS, and mixtures thereof. The buffering agent may include sodium tetraborate.

According to yet another embodiment, the sealer composition for sealing exposed wood before finishing the wood may include polymer solids, an acid neutralizing agent, and a solvent. The solvent may include water.

In still another embodiment, the present invention discloses a method of finishing wood that has been previously finished including the steps of: locating an exposed section of wood not covered by the finish; bleaching the exposed section of wood with an acidic bleach; neutralizing any remaining acid on the exposed section with a sealer composition; and finishing the wood.

According to still a further embodiment, the method of finishing wood that has been previously finished may include the step of sealing the exposed section with a sealer composition. The sealer composition may include polymer solids. The polymer solids may be selected from the group consisting of: acrylate monomers, urethane monomers, and combinations thereof.

According to yet a further embodiment, the step of neutralizing may include neutralizing any remaining acid on the exposed section with a sealer composition that may include a neutralizing agent. The neutralizing agent may include sodium tetraborate.

According to still another embodiment, the present invention discloses a method of finishing wood that has been previously finished including the steps of: locating an exposed section of wood not covered by the finish; bleaching the exposed section of wood with an acidic bleach; neutralizing any remaining acid on the exposed section with a sealer composition; sealing the exposed section with a sealer composition; and finishing the wood. The sealer composition may include polymer solids selected from the group consisting of: acrylate monomers, urethane monomers, and combinations thereof.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

DETAILED DESCRIPTION OF THE INVENTION

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to "one embodiment," "an embodiment," or similar language means that a particular feature, structure, or characteristic described in connection with the embodiment is included in at least one embodiment of the present invention. Thus, appearances of the phrases "one embodiment," "an embodiment," and similar language throughout this specification may, but do not necessarily, all refer to the same embodiment, different embodiments, or component parts of the same or different illustrated invention. Additionally, reference to the wording "an embodiment," or the like, for two or more features, elements, etc. does not mean that the features are related, dissimilar, the same, etc. The use of the term "an embodiment," or similar wording, is merely a convenient phrase to indicate optional features, which may or may not be part of the invention as claimed.

Each statement of an embodiment is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The independent embodiments are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional, unrecited elements or method steps. "Comprising" is to be interpreted as including the more restrictive terms "consisting of" and "consisting essentially of."

Finally, the fact that the wording "an embodiment," or the like, does not appear at the beginning of every sentence in the specification, such as is the practice of some practitioners, is merely a convenience for the reader's clarity. However, it is the intention of this application to incorporate by reference the phrasing "an embodiment," and the like, at the beginning of every sentence herein where logically possible and appropriate.

The sealer composition of the present invention may include polymer solids and an acid neutralizing agent. The composition may also include a solvent.

The polymer of the present invention may be any known in the art of sealer and/or finish compositions. In one embodiment, the polymer is suitable for a sealer and/or a finish on wood. Some suitable polymers for the present invention may include polymers of, for example, urethane monomers, ethylene monomers, propylene monomers, butylene monomers, styrene monomers, acrylate monomers, combinations thereof, and the like. The polymer may be a combination of various monomers making, for example, a copolymer, terpolymer, or the like. In one embodiment, the polymer includes a urethane monomer. In another embodiment, the polymer includes a plurality of urethane monomers. In still another embodiment, the polymer includes an acrylate monomer. In yet another embodiment, the polymer includes a plurality of acrylate monomers. In a further embodiment, the polymer includes a urethane monomer and an acrylate monomer.

The polymer may include one or a plurality of strands. In one embodiment, the polymer includes a single-strand. In another embodiment, the polymer may be branched. In yet another embodiment, the polymer may be star-shaped. According to one embodiment, the polymer may be aliphatic.

The acid neutralizing agent may by one that neutralizes any remaining acid left on the exposed wood. Before being sealed and/or finished, exposed wood sections may be bleached using, for example, oxalic acid. The acid left on the wood may be neutralized by the acid neutralizing agent of the sealer composition. Useful neutralizing agents may include bases and/or buffering agents.

Without limiting the invention, it is theorized that the buffering agent neutralizes the acidity of the acid used to bleach the exposed wood surface, thus raising the pH of the exposed wood to a level at which a new finish may be applied without "sliming." In one embodiment, the buffering agent includes a partially or non-neutralized base. Any base known in the art may be used, preferably a weak base. Non-limiting examples of weak bases include sodium carbonate, sodium bicarbonate, ammonia, sodium tetraborate, triethanolamine, sodium citrate, and TRIS. In one embodiment, the base comprises a $pK_A$ (acid association constant) that is about equal to the desired pH of the composition. Table 1 lists the $pK_A$ of each base listed. It is known in the art that the base composition has the strongest buffering capacity when the pH of the composition matches the listed $pK_A$ of the base. A preferred base is sodium tetraborate, which has a $pK_A$ of about 9.2. Sodium tetraborate provides a buffering agent with a pH that is sufficiently close to neutral without being acidic.

TABLE 1

| | Base | | | | | | |
|---|---|---|---|---|---|---|---|
| | Sodium Carbonate | Sodium Bicarbonate | Ammonia | Sodium Tetraborate | Triethanolamine | Sodium Citrate | TRIS |
| $pK_A$ | 10.3/6.4 | 10.3/6.4 | 9.2 | 9.2 | 7.8 | 6.4 | 8.3 |

In one embodiment, the sealer composition includes at least about 11 weight percent polymer or about 17 weight percent polymer or about 20 weight percent polymer; and less than about 26 weight percent polymer or about 29 weight percent polymer or about 35 weight percent polymer. In one embodiment, the sealer composition includes at least about 1 gram per liter of base to about 5 grams per liter of base to about 10 grams per liter of base; and less than about 20 grams per liter of base or about 30 grams per liter of base or about 40 grams per liter of base.

The pH of the composition may be adjusted to the desired pH of the composition using well-known adjusting techniques. One well-known pH adjusting technique includes the addition of a strong base, such as sodium hydroxide, to raise the pH, or the addition of a strong acid, such as hydrochloric acid, to lower the pH. It should be noted that a pH above about 11 may lead to discoloration if accidentally applied to bare wood. Accordingly, it is noted that sodium tetraborate is typically a safe base to use, with respect to sufficient buffer strength and the ability to avoid undesirable discoloration.

In this embodiment, the pH of the composition may be adjusted using a weak acid or a weak base. Adjustments to the pH of the composition are known, and one skilled in the art would be able to calculate the required adjustment. In one embodiment, the surface to be treated with the composition includes an acidic finish, and the buffering agent used in the composition is sodium tetraborate. The pH may be adjusted to a predetermined level using a weak acid such as, for example, adipic acid.

The buffering agent may include a plurality of partially or non-neutralized weak bases. For example, the bases may include at least two bases selected from triethanolamine, ammonia, sodium tetraborate, sodium citrate, sodium carbonate, sodium bicarbonate, and TRIS. In one embodiment, the composition includes buffering agents which include both ammonia and triethanolamine. One skilled in the art would recognize that there are plethoric potential compositions available from the specified list of bases coupled with the potential strong and/or weak acids or bases used to adjust the pH to within the desired range.

In another embodiment, the neutralizing agent may be a base. Any base may be used. In one particular embodiment, the base is a weak base such as, for example, triethanolamine, ammonia, sodium tetraborate, sodium citrate, sodium carbonate, sodium bicarbonate, and TRIS.

In one embodiment, the sealer composition also includes a solvent. The solvent may be polar or non polar. According to one particular embodiment, the solvent may be water-soluble. The solvent may be water. The solvent is configured to at least partially dissolve the polymer. In an embodiment where the solvent is water soluble, and the polymer is a polyurethane, the polymer may be dissolved in the solvent. Dissolving the polymer in a solvent may produce a dissolved polymer composition. This dissolved polymer composition may be from about 10% solids to about 75% solids, preferably less than about 35% solids. In one embodiment, the dissolved polymer composition includes about 30% solids.

Also disclosed is a method of sealing and neutralizing exposed wood. The exposed wood may be wood that had previously been finished. The method includes the steps of locating the exposed section of wood that is not covered by the finish. Once the exposed section of wood is found, if the wood has discoloration, the exposed section may be bleached to remove the discoloration. The wood may be bleached using any composition known in the art for removing such discolorations. The bleaching composition may be acidic. The bleaching composition may be oxalic acid. The step of bleaching may leave unused bleach on the exposed surface.

The method may also include the step of neutralizing the exposed surface by the application of a sealing composition according to any embodiment of the composition herein described. The sealing composition that includes a neutralizing agent may be used to neutralize the exposed surface.

The method may also include the step of sealing the exposed surface by application of a sealing composition according to any embodiment of the composition herein described. Thus, because the sealing composition includes both polymer solids and a neutralizing agent, the steps of neutralizing and sealing the exposed wood may be performed in a single step of applying the sealing composition of the present invention to the exposed wood.

In order to demonstrate the practice of the present invention, the following examples have been prepared. The examples should not, however, be viewed as limiting the scope of the invention. The claims will serve to define the invention.

EXAMPLES

Four solutions were prepared and tested. Solutions 1-4 contained specified amounts in accordance with the following charts:

SOLUTION 1

| Water | Triethanolamine | Adipic Acid | Synteko Sealmaster 1600 (Water-based polyurethane/acrylic dispersion - about 35% solids) |
|---|---|---|---|
| 1160 mLs | 214 mLs | 58.1 grams | 2400 mLs |

SOLUTION 2

| Water | TRIS | Synteko Sealmaster 1600 (Water-based polyurethane/acrylic dispersion - about 35% solids) |
|---|---|---|
| 300 mLs | 100 grams | 700 mLs |

SOLUTION 3

| Water | Synteko Sealmaster 1600 (Water-based polyurethane/acrylic dispersion - about 35% solids) |
|---|---|
| 300 mLs | 700 mLs |

SOLUTION 4

| Water | Sodium Tetraborate | Synteko Sealmaster 1600 (Water-based polyurethane/acrylic dispersion - about 35% solids) |
|---|---|---|
| 284 mLs | 12.5 grams | 660 mLs |

A birch hardwood floor was treated with an oxalic acid solution and cleaned with a detergent cleaner. A coat of the neutralized sealer of solution 1 was applied to one-half of the floor and the coat was allowed to dry. A water-based polyurethane finish was applied to the whole floor. The portion of the floor not sealed by solution 1 showed evidence of sliming (acidic precipitation of the polyurethane solids), while the portion of the floor sealed by solution 1 was unaffected by the oxalic acid residue.

An oak hardwood floor was treated with an oxalic acid solution and cleaned with a detergent cleaner. A coat of the neutralized sealer of solution 2 was applied to one-half of the floor and a coat of the neutralized sealer of solution 3 was applied to the other half of the floor. The portion of the floor sealed by solution 3 showed evidence of sliming (acidic precipitation of the polyurethane solids), while the portion of the floor sealed by solution 2 was unaffected by the oxalic acid residue.

One-half of a birch hardwood floor was treated with a coat of the neutralized sealer of solution 4 and the coat was allowed to dry. A water-based polyurethane finish was applied to all areas of the floor. The portion of the floor not sealed by solution 4 looked much darker than the original color of the untreated floor, while the portion of the floor sealed by solution 4 retained the original color of the untreated floor.

One-half of an oak hardwood floor was treated with a coat of the neutralized sealer of solution 4 and the coat was allowed to dry. A water-based polyurethane finish was applied to all areas of the floor. The portion of the floor not sealed by solution 4 looked much darker than the original color of the untreated floor, while the portion of the floor sealed by solution 4 retained the original color of the untreated floor.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claim rather than by the foregoing description. All changes which come within the meaning and range of equivalency of the claims are to be embraced within their scope.

For example, although the discussed embodiments refer only to a wood surface that may be sealed and/or neutralized by the composition of the present invention, it is envisioned that any surface that is bleached with an acid and then sealed and/or finished may be neutralized and sealed by the composition of the present invention. Some non-limiting examples of materials that may be neutralized and/or sealed by the composition of the present invention include: wood, cork, laminate, composite, plastic lumber such as that sold under the trade name Recycle Design™ by Trimax (Chicago, Ill.), and DuraWood HDPE, also by Trimax (Chicago, Ill.), metal, leather, and the like Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. A sealer composition for sealing exposed wood before finishing the wood, the exposed wood being treated by a bleach leaving excess acid on the exposed wood, consisting of:
   a dissolved polymer composition consisting of polymer solids and a solvent, wherein the polymer solids comprise between about 11 weight percent and about 35 weight percent of the sealer composition; and
   between about one gram per liter and about 40 grams per liter of an acid neutralizing agent;
   wherein the relative proportions of the polymer solids, solvent, and acid neutralizing agent are such that the sealer composition seals the exposed wood and neutralizes the excess acid on the exposed wood when the sealer composition is applied to the exposed wood.

2. The sealer composition of claim 1, wherein the polymer solids include a polymer of acrylate monomers.

3. The sealer composition of claim 1, wherein the polymer solids include a polymer of urethane monomers.

4. The sealer composition of claim 1, wherein the polymer solids include urethane monomers and acrylate monomers.

5. The sealer composition of claim 1, wherein the acid neutralizing agent includes a base.

6. The sealer composition of claim 5, wherein the base includes one selected from the group consisting of: triethanolamine, ammonia, sodium tetraborate, sodium citrate, sodium carbonate, sodium bicarbonate, TRIS, and mixtures thereof.

7. The sealer composition of claim 5, wherein the base is sodium tetraborate.

8. The sealer composition of claim 1, wherein the neutralizing agent includes a buffering agent.

9. The sealer composition of claim 8, wherein the buffering agent includes a weak base selected from the group consisting of: triethanolamine, ammonia, sodium tetraborate, sodium citrate, sodium carbonate, sodium bicarbonate, TRIS, and mixtures thereof.

10. The sealer composition of claim 8, wherein the buffering agent includes sodium tetraborate.

11. The sealer composition of claim 1, wherein the solvent includes water.

12. The sealer composition of claim 1, wherein the relative proportions of the polymer solids, solvent, and acid neutralizing agent result in a desired pH level of the sealer composition, the desired pH level of the sealer composition being associated with a pH level sufficient to neutralize excess acid on the exposed wood.

13. The sealer composition of claim 12, wherein the pH level of the sealer composition is approximately equal to an acid association constant of the acid neutralizing agent.

14. The sealer composition of claim 1, wherein the relative proportions of the polymer solids, solvent, and acid neutralizing agent result in the sealer composition preventing premature precipitation of polymer solids on the bleach treated exposed section of wood when applied to the exposed wood.

15. The sealer composition of claim 1, wherein the acid neutralizing agent comprises a buffering agent, the composition further consisting of a base comprising one of a strong base and a weak base.

16. A sealer composition for sealing exposed wood before finishing the wood, the exposed wood being treated by a bleach leaving excess acid on the exposed wood, consisting of:
  polyurethane solids;
  an acid neutralizing agent; and
  a solvent;
  wherein the polyurethane solids are dissolved in said solvent and the relative proportions of the polyurethane solids, solvent, and acid neutralizing agent are such that the sealer composition seals the exposed wood and neutralizes the excess acid on the exposed wood when the sealer composition is applied to the exposed wood.

17. A sealer composition for sealing exposed wood before finishing the wood, the exposed wood being treated by a bleach leaving excess acid on the exposed wood, consisting of:
  polyurethane and acrylate solids;
  an acid neutralizing agent; and
  a solvent;
  wherein the polyurethane and acrylate solids are dissolved in said solvent and the relative proportions of the polyurethane and acrylate solids, solvent, and acid neutralizing agent are such that the sealer composition seals the exposed wood and neutralizes the excess acid on the exposed wood when the sealer composition is applied to the exposed wood.

* * * * *